F. S. Pease.

Harvester Rake.

No. 153

Reissued Dec. 18, 1849.

F. S. Pease.
Harvester Rake.

№ 153 Reissued Dec. 18, 1849.

F. S. Pease.
Harvester Rake.

№ 153 Reissued Dec. 18, 1849.

Sheet 4 5 Sheets.

F. S. Pease.

Harvester Rake.

153

Reissued Dec. 18, 1849.

F. S. Pease.
Harvester Rake.
No 153 Reissued Dec. 18, 1849.
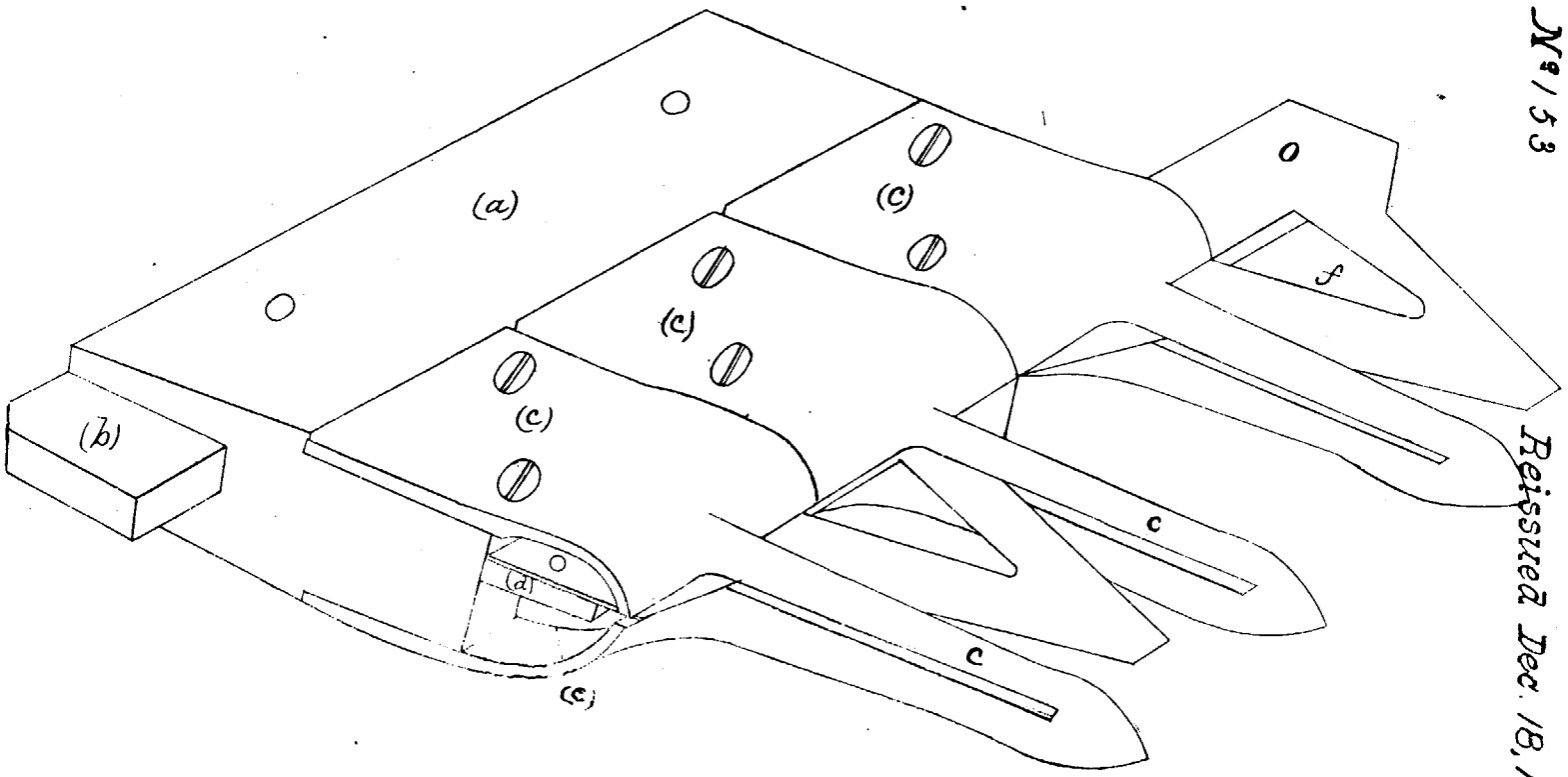

UNITED STATES PATENT OFFICE.

FRANCIS S. PEASE, OF BUFFALO, NEW YORK.

IMPROVEMENT IN HARVESTING-MACHINES.

Specification forming part of Letters Patent No. 5,925, dated November 14, 1848; Reissue No. 153, dated December 18, 1849.

*To all whom it may concern:*

Be it known that I, FRANCIS S. PEASE, of the city of Buffalo, in the county of Erie and State of New York, have invented certain new and useful Improvements in Grass and Grain Cutting Machines, of which the following is a full, clear, and exact description, reference being had to the accompanying drawings, in which—

Figure 1:
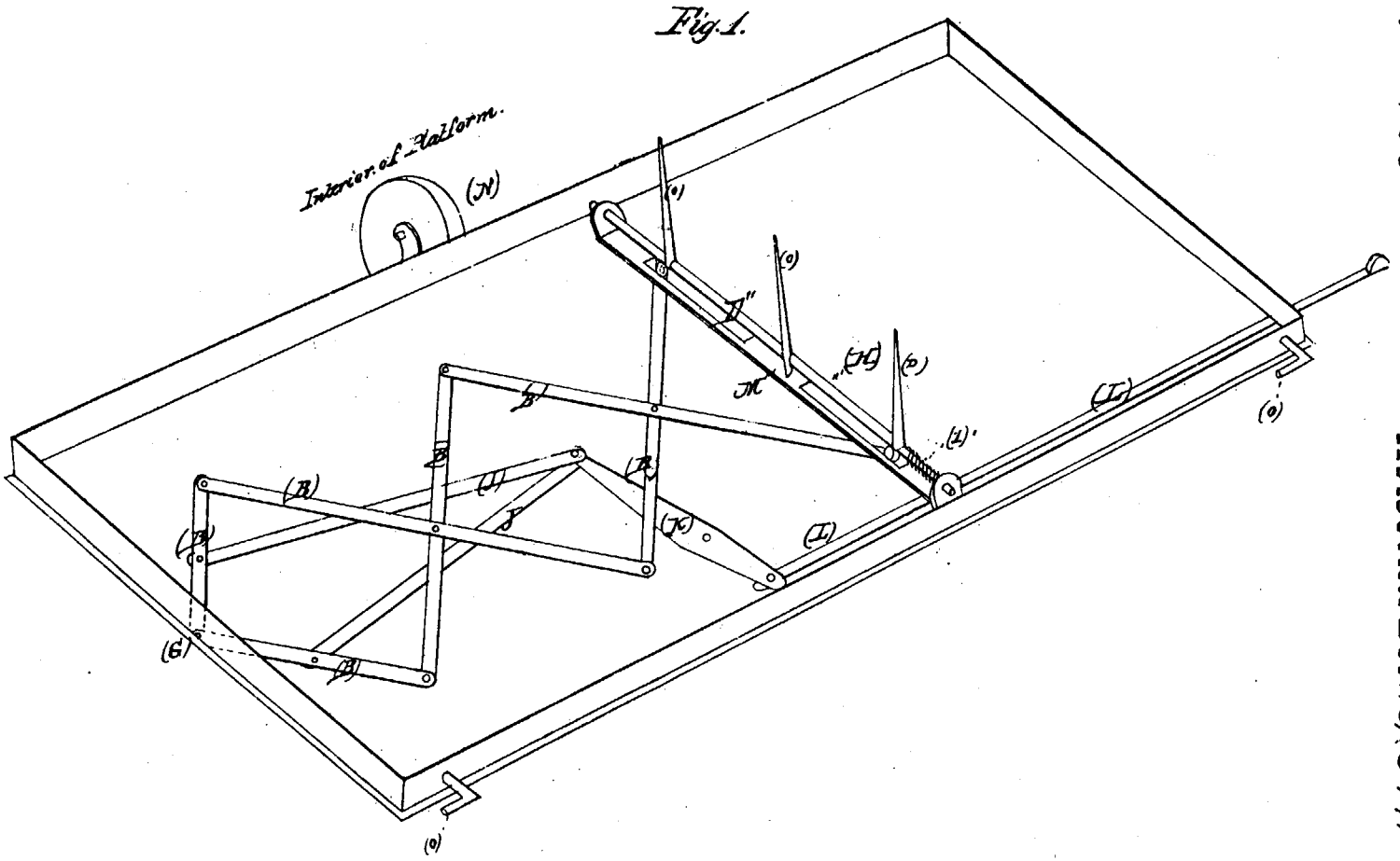
Figure 2:
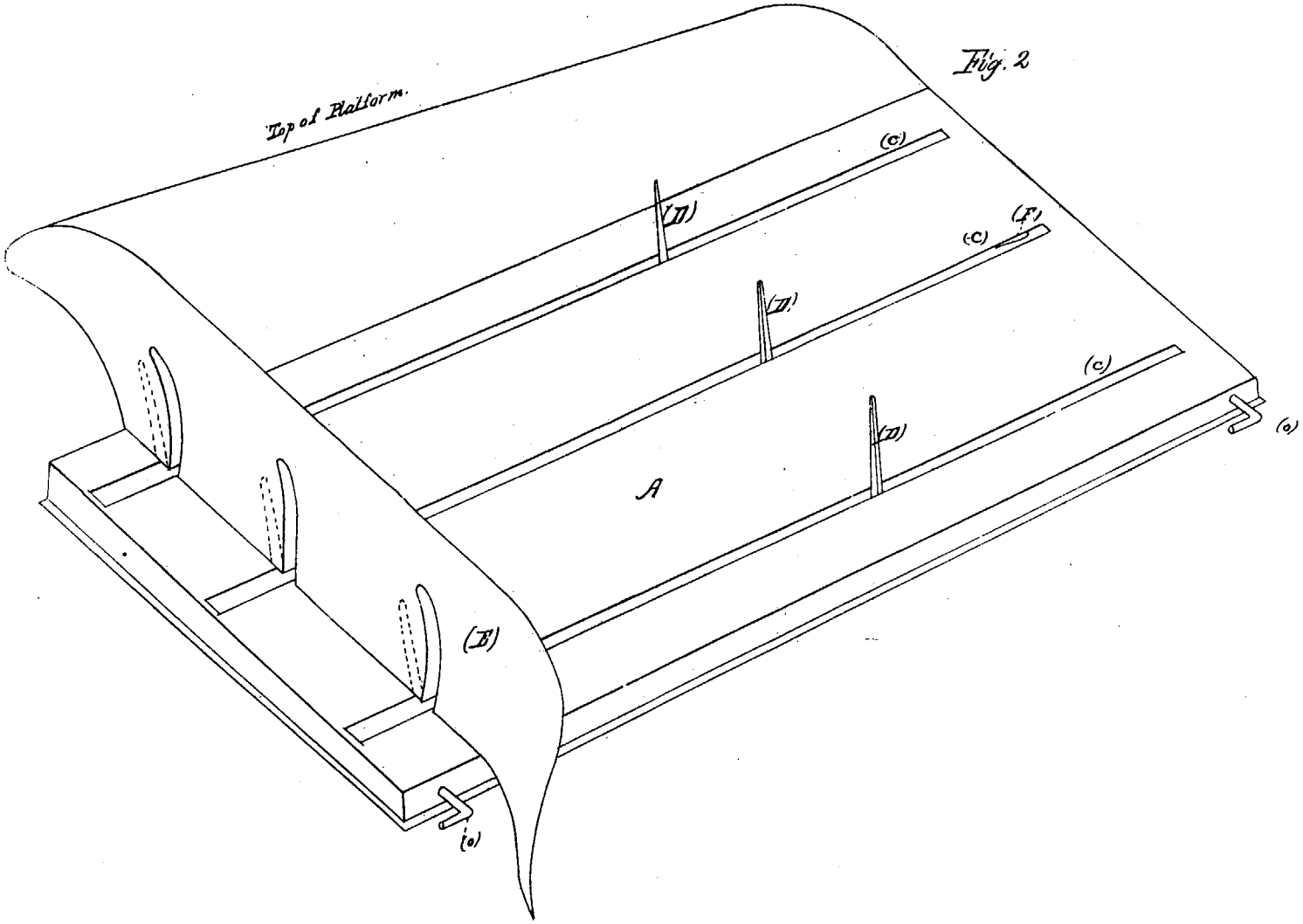
Figure 3:
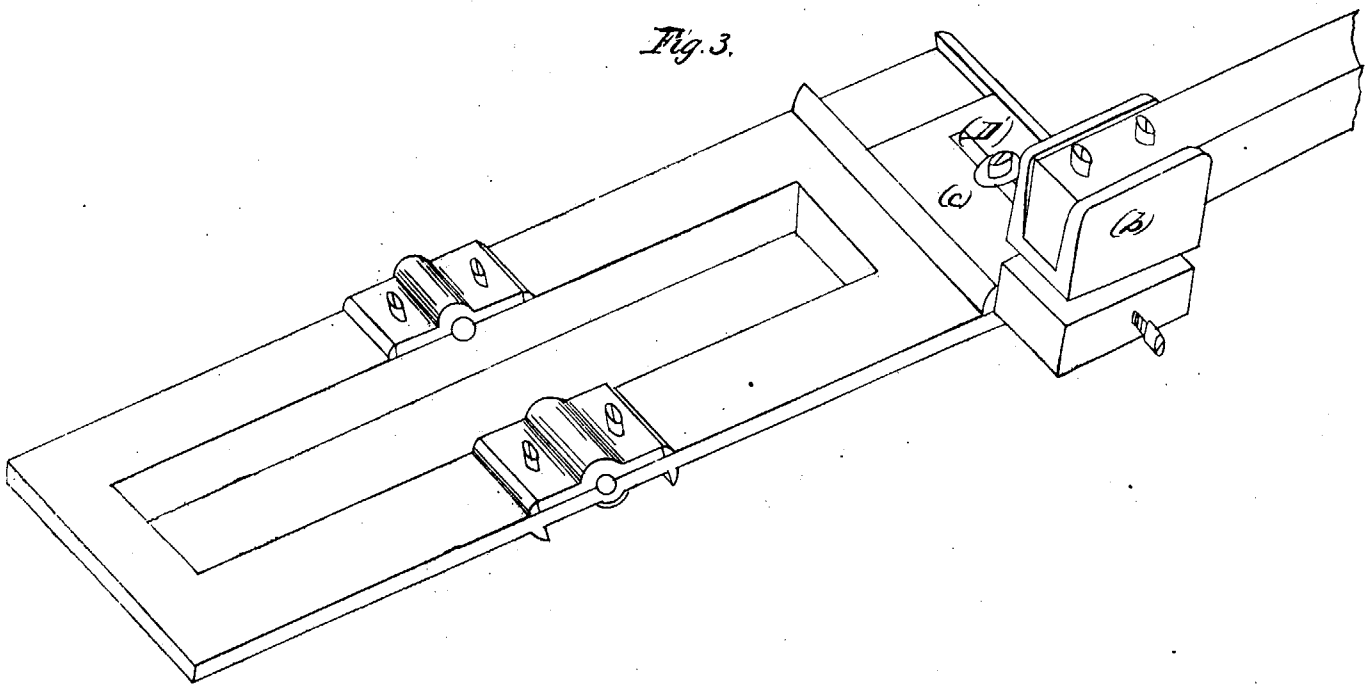
Figure 4:
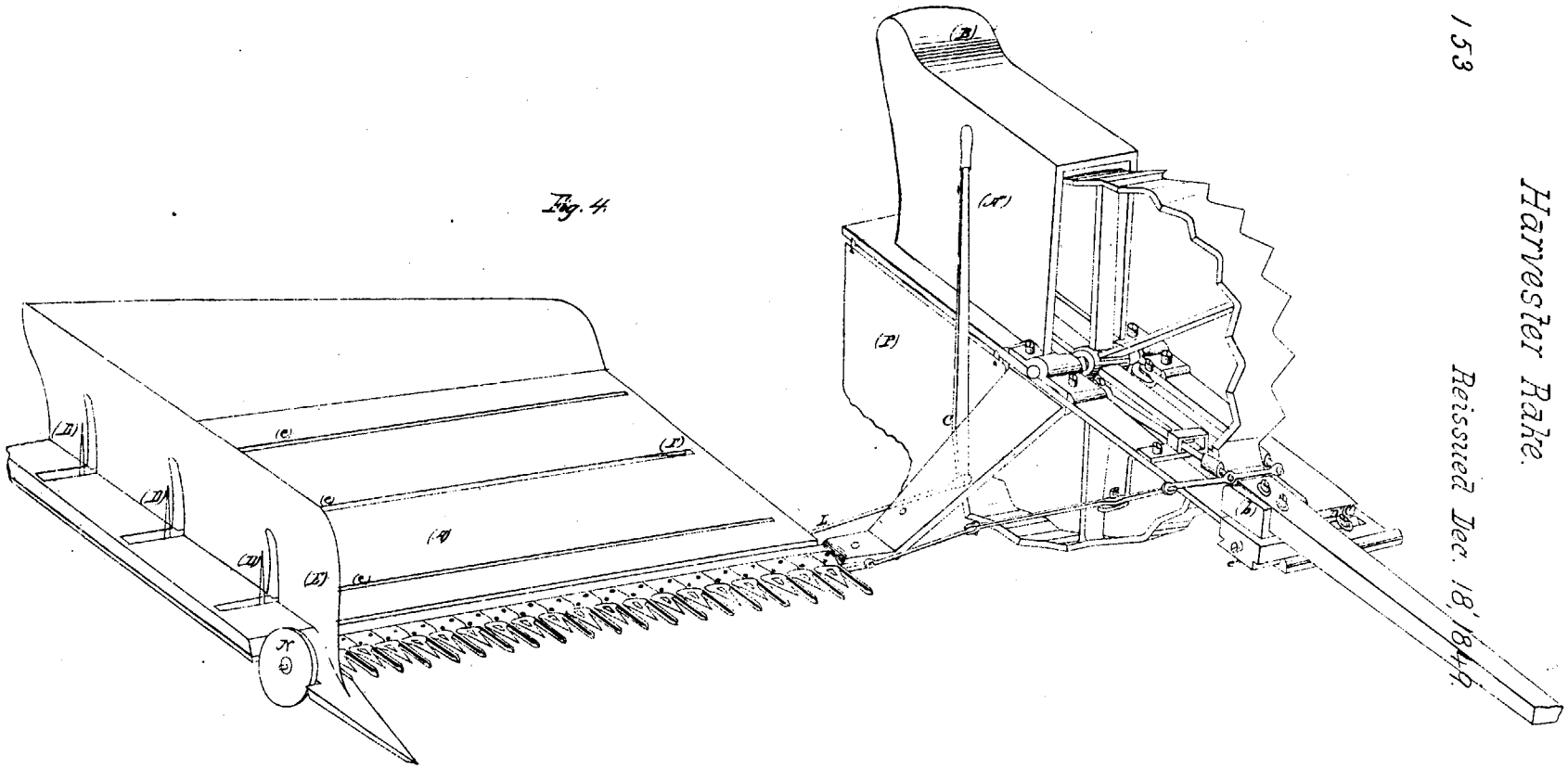

Figure 1 is a view of the platform, with the top A removed to show the mechanism of the rake; Fig. 2, a view of a portion of the cutting apparatus; Fig. 3, a view of the arrangement for adjusting the draft, and Fig. 4 a view of the machine complete.

The same letters indicate the same parts in the various figures.

The nature of my invention consists—

First, in the construction and arrangement of a raking-platform attached to a grass or grain cutting machine. The said platform is made double, and the rake-teeth which traverse its upper surface are moved by an arrangement of levers between the top and bottom of the platform, to which motion is given either by hand or by the machine itself. By these rake-teeth the grain at suitable intervals is effectually removed from the platform on which it falls when cut.

Second, in the construction of a rack-bar of wood and iron combined, the stiffness being given by the wood and the strength by the iron, by which combination of materials a rack-bar of sufficient strength and stiffness is obtained, yet much lighter and narrower than if constructed entirely of wood, and much cheaper and lighter than if constructed wholly of iron.

Third, in the construction of rack-teeth of wrought, malleable, or cast iron, with bases sufficiently wide to cover both the top and bottom of the wooden portion of the rack-bar to which they are attached, thus increasing its strength and protecting it, as well as the cutter-bar, which moves within the teeth, from dirt, grass, or grain.

Fourth, in the arrangement for attaching the draft in such manner that the draft can be adjusted to suit any machine to which it is applied.

In the drawings, A, Fig. 1, is the raking-platform, of sufficient width to receive the grain which falls upon it, and as long as the rack-bar of the machine to which it is attached. This platform is double, there being sufficient space between its top and bottom to receive the combination of levers which give motion to the rake-teeth. Slots C are cut through the top of the platform in the direction in which the raking is to be performed, and in these slots the rake-teeth D traverse. The rake-teeth D project sufficiently above the top of the platform to remove all the grain that may fall upon it. They are all connected beneath the top of the platform by the rod H, whose extremities are supported by the cross-head M, to which motion is given by the combination of hinged levers B B. The rod H is movable on journals at its extremities, and can be turned (by means hereinafter described) toward the end of the platform where the grain is discharged. It is retained in its upright position by the tensive force of the spring I, coiled upon it, one of whose ends is attached to the cross-head and the other to the rod H. One end of the combination of levers B B is attached to the end of the platform at G, and to the pair nearest this point of attachment are connected the extremities of the rods J J, whose opposite ends are connected with one arm of the lever K. To the opposite arm of this lever K a rod, L, is attached, by which power is applied to move the rake-teeth. The rod L is on the side of the platform nearest the rack-bar, and projects beyond the end of the platform nearest the horses, by which position it is protected from the falling grain.

F is a spring which crosses one of the slots (in the top of the platform) in which the rake-teeth move. It is so placed that the rake-teeth in discharging the grain pass along its inclined surface and shove it out of their track, but are prevented from returning in the same slot by coming in contact with its square extremity, by which they are depressed below the top of the platform, and in that position forced to traverse its length in their return-stroke in grooves formed in the lower surface of the upper plate of the platform parallel with and adjoining the slot C. On passing the turn-off E at the extremity of the rack-bar the rake teeth are released from the grooves and forced to assume their upright position by the action of the spring I. The turn-off E extends across the whole width of the platform immediately succeeding the last rack-tooth, it projects sufficiently above the platform to prevent the escape of the cut grain at that end, and is furnished with slots corresponding with the longitudinal slots in the platform through which the rake-teeth pass in removing the grain. It also protects the rising rake-teeth from the falling grain. A wheel, N, is attached to the back of the outer extremity of the platform, by which the latter is supported at a sufficient distance above the ground.

*o o* are hooks or staples by which the platform is easily connected with the rack-bar. The combination of hinged levers between the top and bottom of the platform is so arranged that the movement of the rod L, attached to the last pair of levers, puts the whole set in motion and moves the rake-teeth D either from or toward the turn-off E. This arrangement of levers possesses the great advantage of occupying but little space, thus enabling me to place them between the top and bottom of the platform, by which they are perfectly protected from accident, and to give this platform a depth but little greater than that of the rack-bar, from which it is hung, sloping downward, while there is sufficient room to allow the stubble to pass freely.

The platform is made of any suitable material, and may be attached to any arrangement of cutters, and is operated in the following manner: The rake-teeth being in an upright position and behind the turn-off, the machine is advanced against the standing grain, which falls upon the platform as fast as it is cut. When a sufficient quantity has been cut power is applied to the rod E, either by a hand-lever, A‴, Fig. 4, or by the motion of the machine itself, and this rod, acting through the levers K and rods J J upon the hinged frame B B, propels the rake-teeth from the turn-off toward the opposite extremity of the machine, removing all the grain which lies upon the platform, and landing it between the platform and the frame to which the horses are attached. By reversing the motion of the rod L the teeth D in their retrograde motion striking against the oblique extremity of the spring F are depressed and return beneath the upper plate of the platform to assume their upright position behind the turn-off E, which protects them from the falling grain. By this method of returning the rake-teeth beneath the upper surface of the platform they are prevented from interfering with the falling grain or with the progressive motion of the machine. The action of the rake-teeth is also entirely under the control of the driver occupying the seat B, Fig. 4, who can remove the grain from the machine whenever he sees fit, and can make allowances for any inequality in the growth of the grain.

My improved rack-bar is represented in Fig. 2. It is formed of wood, *a*, having a strip of iron, *b*, inserted in its back edge, and firmly riveted to the wood. The strip of iron may also be riveted to the top, bottom, or back of the wood. By this construction sufficient strength is obtained without increasing the width of the wooden portion of the rack-bar. A narrow rack-bar possesses the advantage of allowing the grain to fall clear of it and leave it easily, whereas if it were made of wood alone it must be so wide (to be sufficiently strong) that the grass or grain will be carried upon it, and thus interfere with the cutting of the standing grain, while if made entirely of iron its weight would be much greater, (to obtain sufficient stiffness,) and its cost would be proportionately increased.

The rack-teeth *c c c*, Fig. 2, may be made of wrought, malleable, or cast iron, the last two materials being preferable, because the teeth, all being made from the same pattern, will exactly resemble each other, and when one is broken a new one can be inserted in its place without requiring the fitting which would be necessary if the tooth were forged. The teeth have a hollow base by which they are attached to the wooden portion of the rack-bar, and a horizontal slot through which the cutter-teeth vibrate. The bases are so wide that those of the adjoining teeth shall touch each other, thus protecting the wood of the rack-bar from grass and dirt, and materially increasing its strength and stiffness.

The cutter-rod *d* is of metal, extending the whole length of the rack-bar. To it the cutter-teeth are attached, independently of each other, so that any one can be removed and replaced without affecting the rest. Each tooth is pierced with a hole, which lessens their weight, thereby diminishing the power required to vibrate the cutter-bar. The cutter-rod *d* slides within the hollow base of the rack-teeth, (the cutter-teeth traversing the slots in the projecting portions of the rack-teeth,) and is supported within the base by a piece projecting from the bottom of each tooth. The cutter-bar is connected by a rod (see Fig. 4) with oscillating levers, to which a vibratory motion is given by the indentations on the main driving-wheel.

Fig. 3 represents the arrangement for adjusting the draft. *a* is the pole to which the team is attached. The butt of this pole is secured in the box *b*, which has a shank attached to its bottom. This shank is fitted in a hole in the carriage *c*, in which it can be raised or lowered, and clamped in any required position by the screw *e*. The carriage *c* slides in a groove transversely across the frame-work of the machine. It can be moved either from or toward the standing, grain and clamped by the screw D. This adjustability of the draft is all important in a machine by which both grass and grain are to be cut, as the draft can be regulated to suit either.

To protect the main driving-wheel from the grain discharged from the platform an apron, P, of leather or other flexible substance, is attached to the frame-work.

I do not claim to be the inventor of the turning, alternating rake and slotted double platform; but What I do claim as my invention, and desire to secure by Letters Patent, is—

1. Alternating the rake and elevating and depressing its teeth by devices made, arranged, and operated substantially as herein described.

2. I do not claim to be the inventor of a tight case for the back of the blade to run in, nor of the slotted teeth to protect its edge; but what I do claim is making a toothed blade-case in uniform sections, *c*, Fig. 2, each section having a tooth cast in one piece with it, the whole being attached to the rack-bar *a*, Fig. 2, by screws or otherwise, in such manner that if the tooth of any section should get broken it may be readily replaced by an extra one cast from the same pattern and kept on hand for that purpose, the rack thus made being equally efficient as a solid case to protect the stock from dirt and obstructions, and can be more easily and cheaply repaired.

3. The manner in which the position of the point of draft is changed by means of the slides *b* and *c*, Figs. 3 and 4, and clamp-screws D and *e*, Fig. 3, as herein set forth.

In testimony whereof I have hereunto signed my name.

FRANCIS S. PEASE.

In presence of—
JAMES G. DICKIE,
NATHAN S. CHALLIS.